(12) United States Patent
Sakurai

(10) Patent No.: US 6,810,021 B1
(45) Date of Patent: Oct. 26, 2004

(54) FRAME RELAY APPARATUS AND METHOD

(75) Inventor: Hideshi Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 769 days.

(21) Appl. No.: 09/696,199

(22) Filed: Oct. 26, 2000

(30) Foreign Application Priority Data

Jan. 14, 2000 (JP) .......................................... 2000-005340

(51) Int. Cl.⁷ ............................................. H04L 12/28
(52) U.S. Cl. ....................................... 370/255; 370/242
(58) Field of Search ................................. 370/255, 256, 370/258, 242, 217, 336.1

(56) References Cited

U.S. PATENT DOCUMENTS 6,215,765 B1 * 4/2001 McAllister et al. ......... 370/217
6,463,037 B1 * 10/2002 Ooyoshi et al. ............ 370/242
6,549,518 B1 * 4/2003 Sugawara ................ 370/236.1

FOREIGN PATENT DOCUMENTS

| JP | 59-193651 | 11/1984 |
| JP | 11-168491 | 6/1999 |

* cited by examiner

*Primary Examiner*—Salvatore Cangialosi
(74) *Attorney, Agent, or Firm*—Staas & Halsey LLP

(57) ABSTRACT

An entry processing unit enters into a table the frame information and the reception time of a frame received by a frame reception unit. Upon the receipt of a frame by the frame reception unit, a loop judgment unit refers to the table to detect a second reception of the same frame to thereby judge the occurrence of a loop. Based on this judgment, the frame processing unit discards the received frame without sending the same, to obviate the occurrence of an infinite loop.

20 Claims, 15 Drawing Sheets

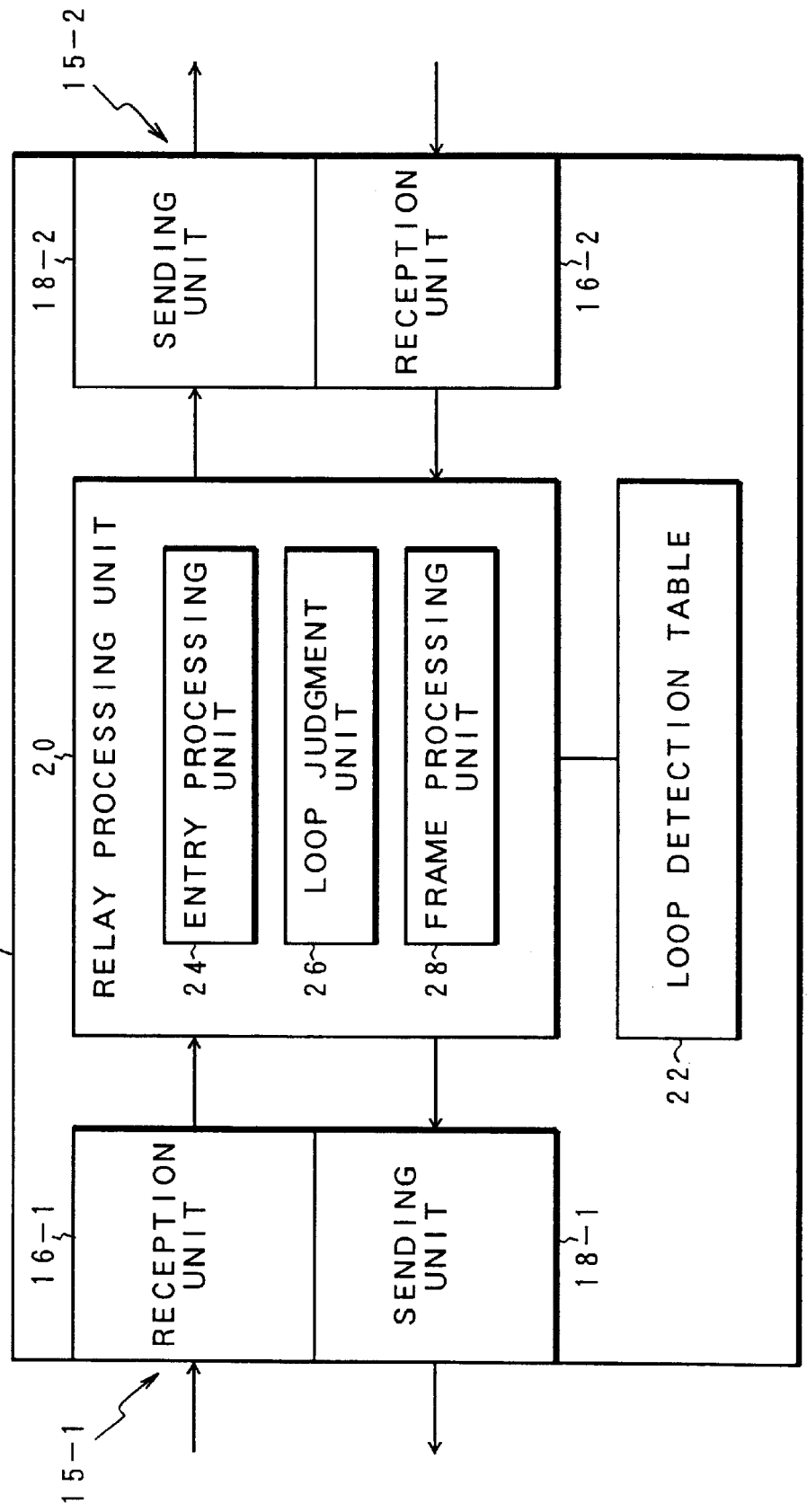

FIG. 4A

| VERSION | IHL | TYPE OF SERVICE | TOTAL LENGTH | |
|---|---|---|---|---|
| IDENTIFICATION | | | FLAG | |
| TIME TO LIVE | PROTOCOL | | HEADER CHECKSUM | |
| SOURCE ADDRESS | | | | |
| DESTINATION ADDRESS | | | | |
| OPTION | | | | PADDING |
| DATA | | | | |

FIG. 4B

| 0 | DF | MF | FRAGMENT OFFSET |
|---|---|---|---|

F I G. 5

| SOURCE ADDRESS | IDENTIFICATION | FRAGMENT OFFSET | TIMESTAMP |
|---|---|---|---|
| 10.1.1.1 | 1000 | 0 | 10000 |
| 10.1.1.2 | 10000 | 1460 | 144000 |
| 10.1.1.3 | 100 | 0 | 1000000 |

22

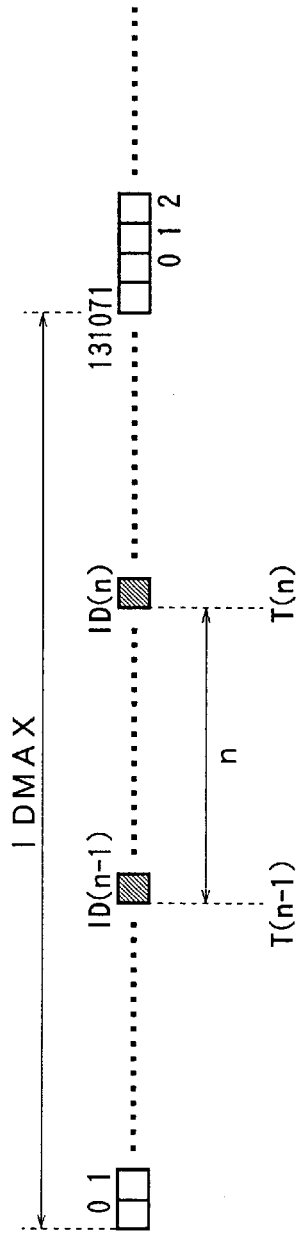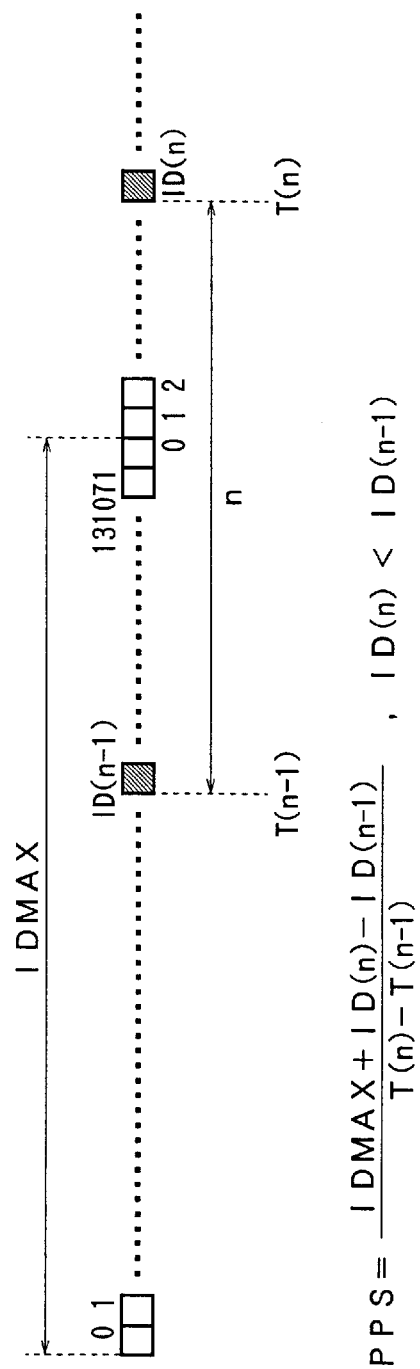
FIG. 6A
FIG. 6B

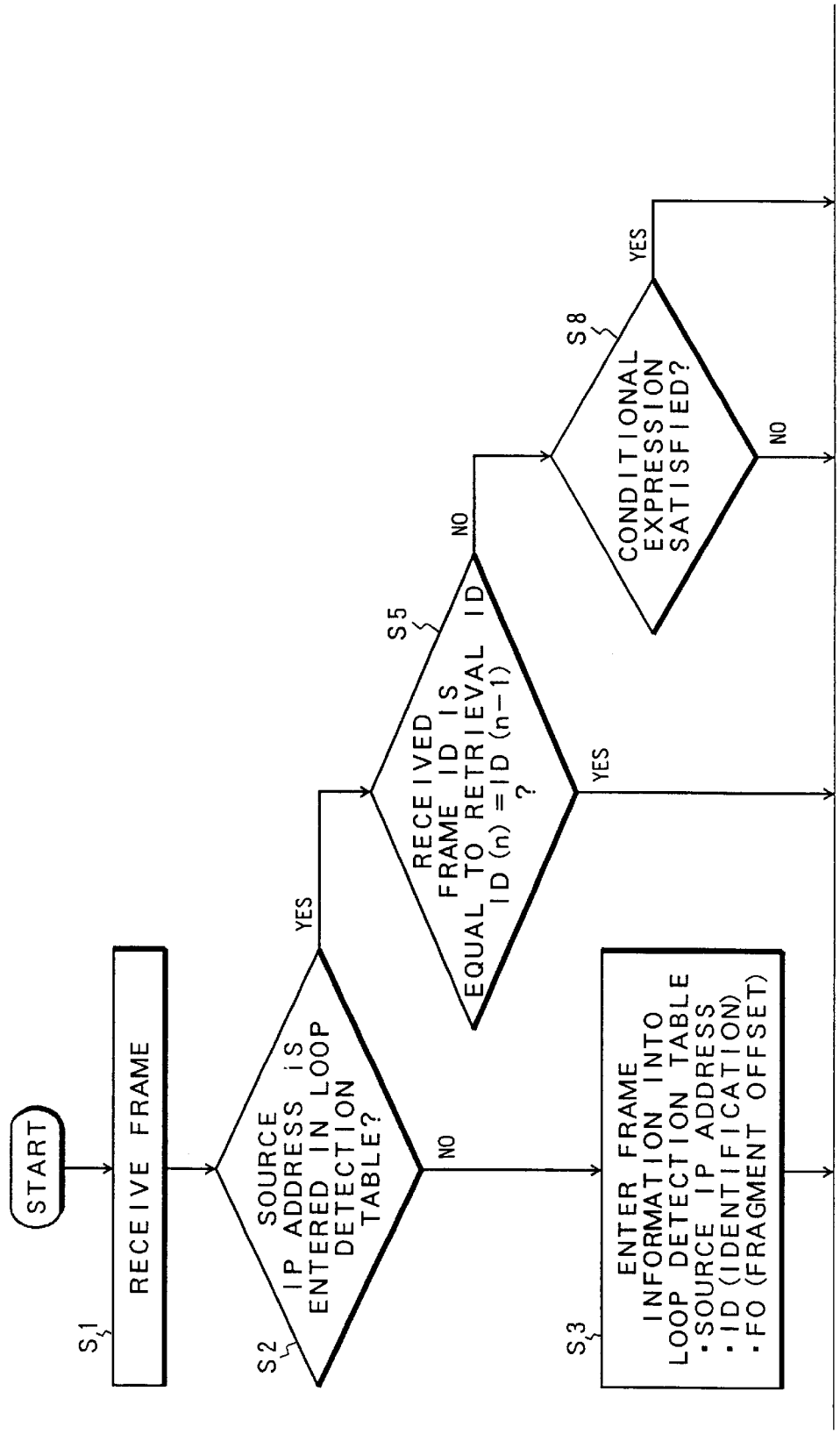

FIG. 11

| SOURCE ADDRESS | IDENTIFICATION | FRAGMENT OFFSET | VID | TIMESTAMP |
|---|---|---|---|---|
| 10.1.1.1 | 1000 | 0 | 1 | 10000 |
| 10.1.1.2 | 10000 | 1460 | 1 | 144000 |
| 10.1.1.3 | 100 | 0 | 2 | 1000000 |

22

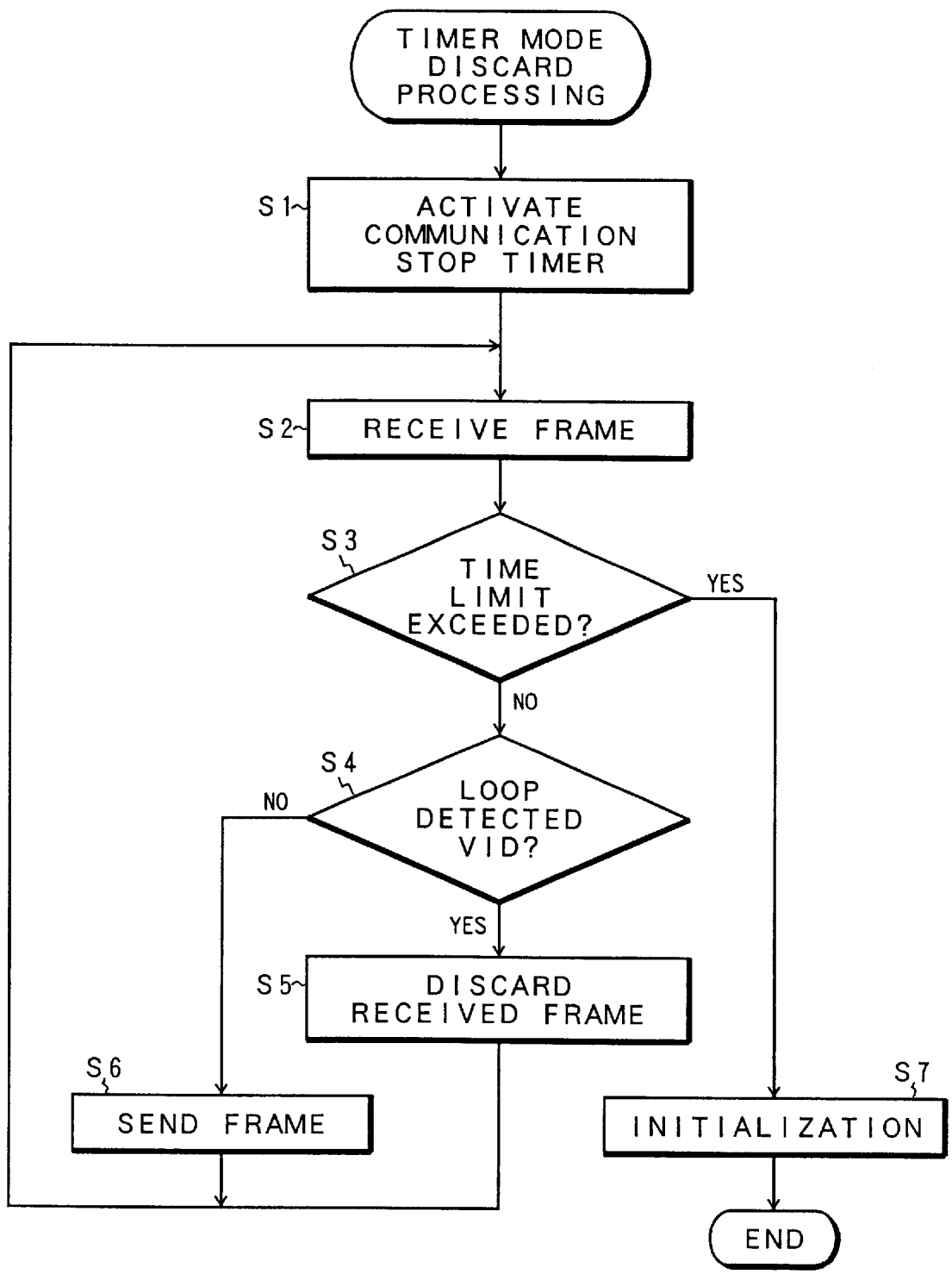

FRAME RELAY APPARATUS AND METHOD

BACKGROUND OF THE INVENTION

1. Field of the Invention

The present invention relates generally to a frame relay apparatus and method for relaying frames, arranged in a network, and more particularly, to a frame relay apparatus for relaying frames so as to obviate an infinite loop of frames which may occur in a looped transmission path.

2. Description of the Relates Art

A typical relay apparatus arranged on an IP network such as Internet or Intranet has hitherto been provided with a function to relay frames depending on MAC addresses that provide the second layer (L2). This frame relay function is called an L2 switching function or simply an L2 switch. The LAN protocols advance toward the integration with the IP protocols. In the network consisting of LAN apparatuses, when a part of the network is cut off, communication may be interrupted and its reliability may be impaired. For the purpose of improving the network reliability, a looped transmission path based redundant structure is built up so as not to interrupt the communication in spite of any possible partial cutoff of the network.

In case of provision of the looped transmission path based redundant structure, there may occur an infinite loop that causes the iteration of the frame transmission in the loop passing through specific L2 switches although the network reliability can be improved. Occurrence of the frame infinite loop may possibly result in a risk of the entire LAN going down. The standardized and prevailing spanning tree is a conventional method for obviating the occurrence of the infinite loop of frames in the LAN. The spanning tree is a technique allowing all the L2 switches to fully post on their own existence periodically and to grasp the loop structure, leaving only one port not dealing in frame sending and reception in the looped LAN.

Referring to FIG. 1A is shown a LAN spanning tree composed of the L2 switches by way of example. This spanning tree includes four personal computers 100-1 to 100-4 acting as nodes which are looped by use of four L2 switches 102-1 to 102-4, with a path extending between the switches 102-1 and 102-3 being severed to allow therein the formation of only one port not dealing in the frame sending and reception. In such a spanning tree, when a cutoff 104 occurs between the L2 switches 102-1 and 102-3 as in FIG. 1B for example, the L2 switch 102-1 judges the cutoff 104 of the network from the absence of information from the L2 switches 102-3 and 102-4 to be sent periodically. When the L2 switch detects the cutoff, the sending and reception by the port for the L2 switch 102-2, that has hitherto been idle, commence to obviate the entire communication break. However, since the spanning tree judges the cutoff of the network from the absence of the information from the L2 switches, if a communication break is erroneously recognized owing to e.g., the loads in the L2 switches or in the transmission path or to the bug of the L2 switches, the looped transfer path is formed as in FIG. 1C, which may eventually cause an infinite loop in the network.

SUMMARY OF THE INVENTION

According to the present invention there is provided a frame relay apparatus and method for judging and obviating the occurrence of a frame infinite loop through analysis of a received frame without relying on the other apparatuses.

According to the present invention there is provided a frame relay apparatus and method for obviating the occurrence of a frame infinite loop in a network which relays frames in conformity with MAC addresses (layer 2 addresses).

The present invention is directed to a frame relay apparatus for relaying frames, arranged in a network including a looped transmission path. The frame relay apparatus of the present invention comprises a frame reception unit for receiving a frame; a frame sending unit for sending a frame; an entry processing unit for entering into a table the frame information and the reception time received by the frame reception unit; a loop judgment unit for referring to the table upon the receipt of a frame by the frame reception unit, to detect a second receipt of the same frame to judge the occurrence of a loop; and a frame processing unit for allowing a received frame to be sent from the frame sending unit when no loop occurrence is judged, but discarding the received frame without sending the same when a loop occurrence is judged. In this manner, without relying on the other apparatuses as in the conventional spanning tree, the frame relay apparatus of the present invention analyzes the received frames by itself to judge the occurrence of an infinite loop to thereby discard the received frames in order to securely obviate the occurrence of the infinite loop, thus building up a highly reliable LAN.

The entry processing unit enters the frame information together with the reception time into the table, the frame information including a source address of an IP frame received by a second layer IP protocol, an ID indicative of a packet sending sequence, and a fragment offset indicative of a segmented position when the ID has the same value. In such an event, the loop judgment unit, in case the received IP frame source address has already been entered in the table, judges whether a received ID is equal to an entered ID, the loop judgment unit when the received ID is not equal to the entered ID, judging that a loop has occurred if a predetermined conditional expression is satisfied, the loop judgment unit when the received ID is equal to the entered ID, judging that a loop has occurred if a received fragment offset is equal to an entered fragment offset.

The conditional expression for the frame processing unit is used to judge that a loop has occurred if a predetermined maximum packet transfer speed is exceeded by a calculated packet transfer speed PPS of a received frame and an entered frame. More specifically, the conditional expression for the frame processing unit is given, when ID (n)>ID (n−1), as $$\{ID(n)-ID(n-1)\}/\{T(n)-T(n-1)\} > \text{MAXPPS}$$

where ID (n) is the value of a received ID, ID (n−1) is the value of an entered ID, IDMAX is the maximum value of the ID, T (n) is the reception time, T (n−1) is the entered reception time, and MAXPPS is the predetermined maximum packet transfer speed, and if the conditional expression is satisfied, then judgment is made that a loop has occurred. The conditional expression for the frame processing unit is given, when ID (n)≦ID (n−1), as $$\{IDMAX+ID(n)-ID(n-1)\}/\{T(n)-T(n-1)\} > \text{MAXPPS}$$

and, if the conditional expression is satisfied, then judgment is made that a loop has occurred. The frame processing unit when judging that a loop has occurred, discards only a received frame of which second receipt has been detected. The frame processing unit when judging that a loop has occurred, suspends the frame relay for a constant period of time, after the discard of a received frame of which second receipt has been detected.

To obviate the occurrence of the infinite loop, the frame relay apparatus of the present invention is arranged on a looped transmission path formed by L3 switches disposed at the boundary of a virtual local area network (hereinafter, referred to as VLAN) which limits the broadcast frame transfer to the interior of the group. In case of provision of the frame relay apparatus of the present invention at the boundary of the LVAN, the entry processing unit enters frame information together with the reception time into the table, the frame information including a source address of an IP frame received by a third layer IP protocol, an ID indicative of a packet sending sequence, and a fragment offset indicative of positions segmented when the ID has the same value, the entry processing unit further entering into the table a virtual LAN tagged frame identifier VID received by the second layer protocol. Similar to the case of the ordinary VLAN, the loop judgment unit, in case the received IP frame source address has already been entered in the table, judges whether a received ID is equal to an entered ID, the loop judgment unit when the received ID is not equal to the entered ID, judging that a loop has occurred if a conditional expression based on the reception time and entered time is satisfied, the loop judgment unit when the received ID is equal to the entered ID, judging that a loop has occurred if a received fragment offset is equal to an entered fragment offset. When judging that a loop has occurred, the frame processing unit adapted for VLAN discards only a received frame of a VLAN of which second receipt has been detected. When judging that a loop has occurred, the frame processing unit may discard a received frame of the VLAN of which second receipt has been detected, to thereafter suspend the relay of a frame having the same VLAN identifier VID for a constant period of time. Even though the loop judged VLAN is identified from VID for discard of the received frame in this manner, normal VLAN frames flowing simultaneously through the boundary between the two VLAN can intactly be relayed in such a manner as to obviate the occurrence of an infinite loop without adversely affecting the other VLANs.

According to the present invention, there is provided a frame relay method for relaying a frame, applied to a network including a looped transmission path, the method comprising a table entry step for entering into a table the frame information and reception time of a frame received through a port; a loop judgment step for referring to the table upon a receipt of a frame through the port, to detect a second receipt of the same frame to thereby make a judgment that a loop has occurred; and a frame processing step for sending a received frame to another port unless it is judged that a loop has occurred, but discarding the received frame without sending the same when it is judged that a loop has occurred. The details of this frame relay method are basically the same as the case of the apparatus configuration.

The above and other objects, aspects, features and advantages of the present invention will become more apparent from the following detailed description when read in conjunction with the accompanying drawings.

BRIEF DESCRIPTION OF THE DRAWINGS

FIG. 3 is a function block diagram of a frame relay apparatus in accordance with the present invention;

FIGS. 4A and 4B are explanatory diagrams of a header format of an IP frame;

FIG. 5 is an explanatory diagram of a loop detection table of FIG. 3;

FIGS. 6A and 6B are explanatory diagrams of conditional expressions implemented by a loop judgment unit of FIG. 3;

FIGS. 7A and 7B are flowcharts of frame relay processing of the present invention effected in an embodiment of FIG. 3;

FIG. 11 is an explanatory diagram of a loop detection table for use in the VLAN of FIG. 9;

FIG. 13 is a flowchart of the VLAN frame discard processing effected in the timer mode of FIG. 9.

DETAILED DESCRIPTION OF THE PREFERRED EMBODIMENTS

Figure 1A:
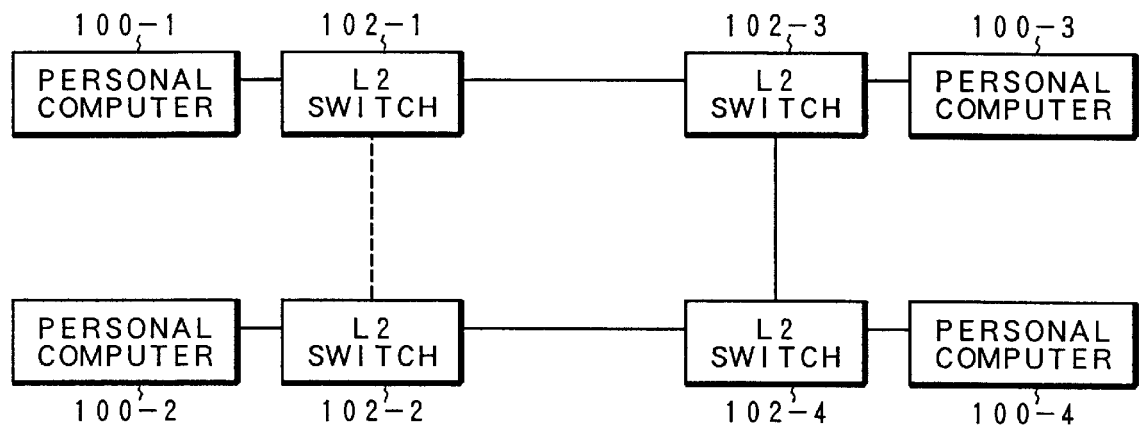
FIGS. 1A to 1C are explanatory diagrams of the obviation of the occurrence of an infinite loop by the conventional spanning tree and the problem it involves.
Figure 1B:
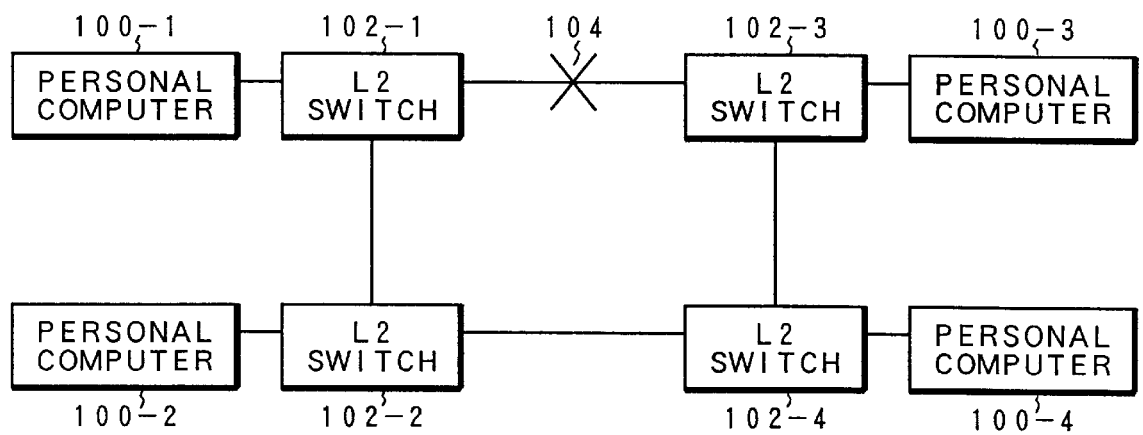
Figure 1C:
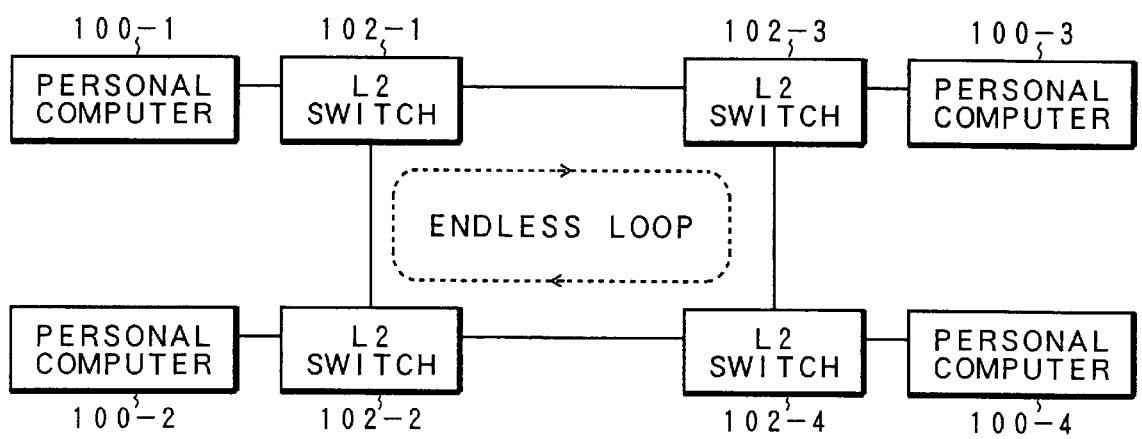
Figure 2:
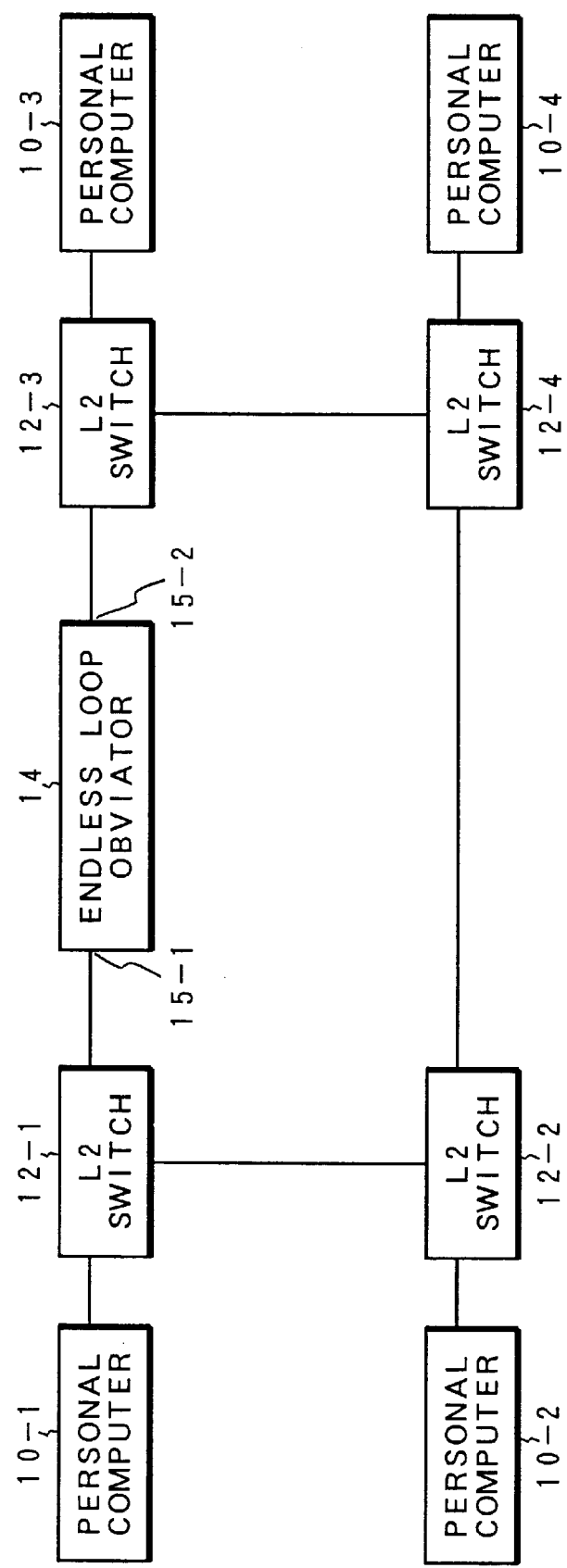
FIG. 2 is an explanatory diagram of a Lan having a looped transmission path to which the present invention is applied.

Referring to FIG. 2 which is an explanatory diagram of a LAN having a frame relay apparatus of the present invention arranged therein, there is shown a network comprised of L2 switches, i.e., a network having a relay apparatus in conformity with an IP protocol for relaying frames depending on the layer 2 address (MAC address). The LAN includes four personal computers 10-1, 10-2, 10-3 and 10-4 acting as nodes and corresponding four L2 switches 12-1, 12-2, 12-3 and 12-4, to form a looped transmission path providing a redundant structure. In the LAN having such a looped transmission path redundant structure, the frame relay apparatus designated at 14 of the present invention is arranged at an arbitrary position on the looped transmission path which may cause an infinite loop, e.g., on a transmission path extending between the L2 switches 12-1 and 12-3. The frame relay apparatus 14 of the present invention arranged in such a looped transmission path has two ports 15-1 and 15-2 and merely relays a frame received at one port to the other port as long as any loop is not detected.

FIG. 3 is a function block diagram of the frame relay apparatus 14 in accordance with the present invention. The frame relay apparatus 14 of the present invention comprises a reception unit 16-1 and a sending unit 18-1 which are provided in the port 15-1, a reception unit 16-2 and a sending unit 18-2 which are provided in the port 15-2, a relay processing unit 20 and a loop detection table 22. In order to detect the loops to obviate the occurrence of an infinite loop, the relay processing unit 20 is provided with an entry processing unit 24, a loop judgment unit 26 and a frame processing unit 28. The entry processing unit 24 enters into the table 22 frame information and reception time of a frame received by the reception unit 16-1 of the port 15-1 or by the reception unit 16-2 of the port 15-2. Upon the reception of the frame by the reception unit 16-1 or 16-2, the loop judgment unit 26 refers to the loop detection table 22 to detect the second reception of the same loop to thereby judge the occurrence of a loop. When no occurrence of the loop is judged, the frame processing unit 28 causes the sending unit 18-1 or 18-2 to send the frame, whereas when the occurrence of the loop is judged, it discards the received frame without sending the same.

Description is then made of the principle of the loop detection effected in the frame relay apparatus 14 of FIG. 3.

FIG. 4A shows an IP header format for use in the layer 2 address frame relay of FIG. 2, in the case of version 4.0 by way of example. FIG. 4B shows in an exclusive manner a detailed format of a flag provided in an ID field of the IP header format. In the loop detection of the present invention, the specific field and the reception time of the received IP frame are entered in the loop detection table 22 so that each time the frame is received, reference is made to the loop detection table 22 to judge the double reception of the same frame. The present invention uses as the IP frame specific field for this frame detection a source address and an ID in the FIG. 4A header format, and a fragment offset of FIG. 4B in the flag. Herein, the header format ID field indicates the IP datagram number indicative of the sequence of the packets sent from the frame sending node. This frame ID datagram number continues to increase up to the maximum value containing the resending datagram except the fragmented datagrams, and returns to 0 when the maximum value is exceeded. Since the ID is of a 16-bit length, the maximum value is 131, 071. The fragment offset FO shown in FIG. 4B represents a prohibited fragment with DF=1 and a possible fragment with DF=0, and then a continuous fragment with MF=1 and a final fragment with MF=0. This fragment offset FO indicates the position of the fragmented datagram, and the value of the fragment offset increases up to the final fragment for each frame with the value of ID remaining unchanged.

FIG. 5 shows a specific example of the loop detection table 22 for use in the frame relay apparatus of the present invention. The loop detection table 22 consists of the source IP address, the ID, the fragment offset FO and the reception time T, which have four values as shown for example depending on the frame reception.

Thus, each time an IP frame is received, the source address, frame Id and fragment offset FO are newly entered into the loop detection table 22 or, if they have already been entered, updated so that upon the coincidence of the source address of a received frame with the source address of the already entered frame, the frame ID is checked to judge the double reception of the same frame without any fragment. In case of the same frame ID, a check is made of the fragment offset FO, and, with the same fragment offset FO, it is judged that the fragmented frames have twice been received. Herein, the judgment of the double reception of the same frame is the loop judgment made in case the same frame attempts to twice pass with looping through the frame relay apparatus 14 of the present invention in the FIG. 2 network, with the above judgment of double reception being made from the coincidence of the received frame with the source address and the ID of the loop detection table 22, or from the coincidence of the source address, the ID and the fragment FO. As opposed to this, the loop detection is the loop judgment based on the variation in the elapsed time from the most recent received frame and in the ID due to different IDs, the above loop detection being made in case of passage through the frame relay apparatus 14 with looping of two or more frames having different IDs sent from a certain node with the same source address. To judge the loop in case of the different IDs with the same source address in this manner, let ID (n) and ID (n−1) be the ID of the currently received frame and the ID with of the same source address of the most recently received frame which has been entered in the table, and let T(n) and T(n−1) be the current reception time and the most recent reception time which has been entered in the table, the conditional expressions for judgment of the frame double reception, i.e., of the loop frame are given as:

when $ID(n)>ID(n-1)$;

$$\{ID(n)-ID(n-1)\}/\{T(n)-T(n-1)\}>MAXPPS \qquad (1)$$

where IDMAX=131, 071: ID maximum value+1
MAXPPS: maximum number of packets per sec.
(MAXPPS=148, 810 with 100 Mbps (IEEE802.3u).

when $ID(n)<ID(n-1)$;

$$\{IDMAX+ID(n)-ID(n-1)\}/\{T(n)-T(n-1)\}>MAXPPS \qquad (2)$$

where IDMAX=131, 071: ID maximum value+1
MAXPPS: maximum number of packets per sec.
(MAXPPS=148, 810 with 100 Mbps (IEEE802.3u).

Following is the description of the conditional expressions (1) and (2) for loop frame judgment with reference to FIGS. 6A and 6B. FIG. 6A shows the case of the expression (1). Assume in FIG. 6A that the ID of the frame having the same source address varies from ID=0 to the maximum value ID=131, 071, with hatched two frames ID (n−1) and ID (n) being looped. The two looped frames have the ID values less than the maximum value 131, 071. Hence $$ID(n)>ID(n-1)$$

is established to allow n frames to lie between the two frames ID (n−1) and ID (n). The reception time is T (n−1) and T (n). Thus, the packet transmission speed PPS in this case is figured out from $$PPS=(ID(n)-ID(n-1)/\{T(n)-T(n-1)\}$$

In the expression (1), therefore, if the packet transmission speed PPS obtained from the relationship between the two frames in the state of FIG. 6A exceeds the maximum value MAXPPS of the packet transmission speed PPS per sec. dependent on the packet sending node, then judgment is made that the packet relay is based on the loops impossible to occur in the ordinary loop relay. FIG. 6B shows the case of expression (2) where the most recent frame ID (n−1) is smaller than the ID maximum value 131, 0171, with the current frame ID (n) exceeding the ID maximum value to again increase from 0. Such a case is given as $$ID(n)<ID(n-1)$$

with the number n of frames lying between the two frames being figured out from $$n=IDMAX+ID(n)-ID(n-1)$$

Therefore, the maximum number of packets per sec. i.e., the packet transmission speed in this case is given as $$PPS=\{IDMAX+ID(n)-ID(n-1)\}/\{T(n)-T(n-1)\}$$

Based on this, comparison is made with the maximum packet number MAXPPS per sec. considered to be dependant on the node as in the expression (2) so that if the maximum value MAXPPS is exceeded, then it is judged to be a loop frame. If the loop judgment unit 26 provided in the frame relay apparatus 14 of FIG. 3 judges the loop frame reception, i.e., double reception of the same frame in this manner, then the frame processing unit 28 discards the received frame which has been judged to be the loop frame, to halt the relay thereof to the sending port. In this loop frame discard by the frame processing unit 28, discard may be made of only the received frames which have been judged to be the loop frame or may be made of all the frames received by the same port during a certain period of time after the discard of the received frames judged to be the loop frame.

Figure 7B:
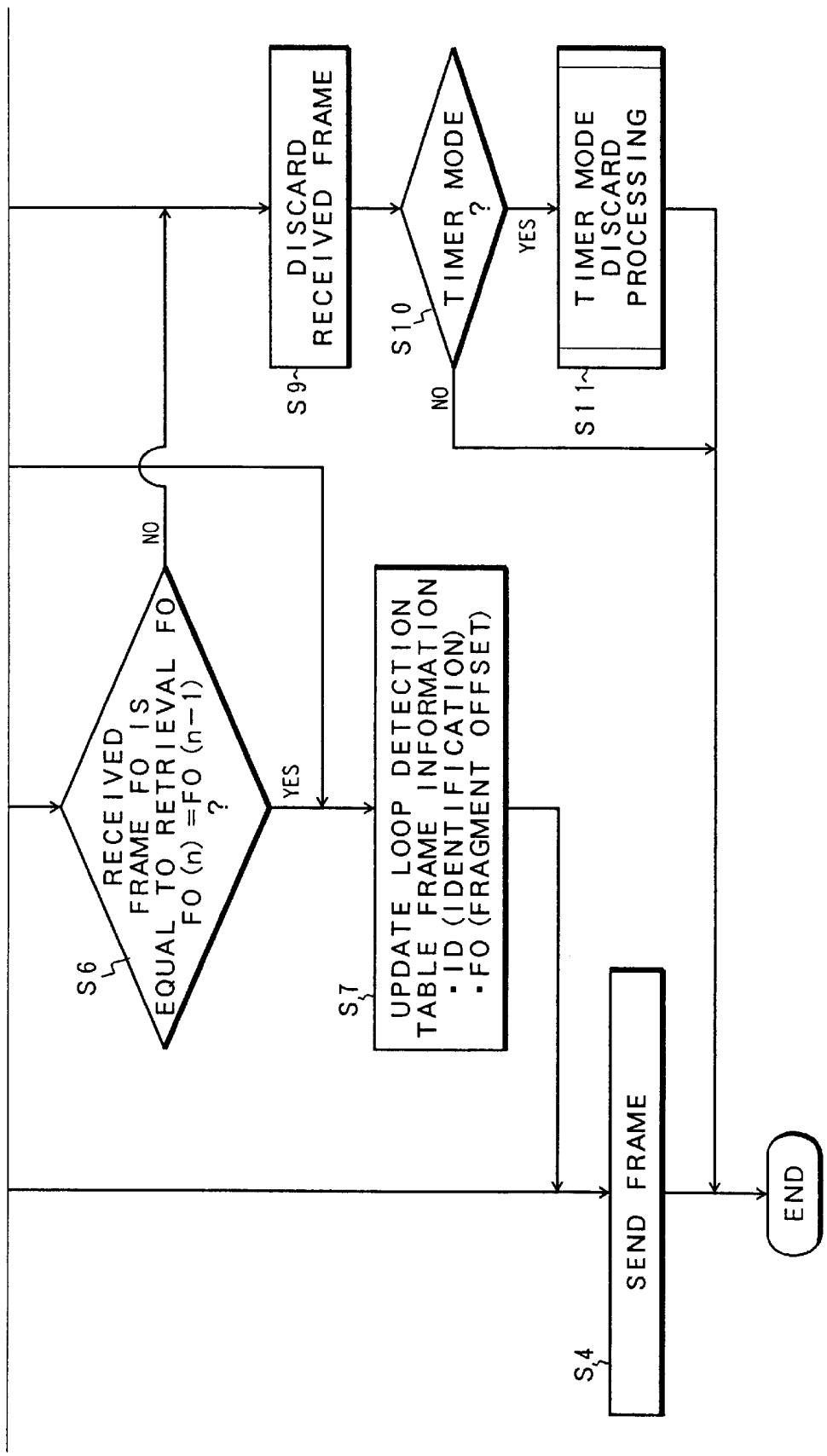

FIGS. 7A and 7B are flowcharts of the relay processing in which the loop frame is judged for discard, effected by the frame relay apparatus of the present invention. If a frame is received in step Si, then procedure goes to step S2 to check whether or not the source IP address has already been entered in the loop detection table 22. If negative, then procedure goes to step S3 to allow the source IP address, ID and fragment offset FO to be entered as the frame information in the loop detection table 22, and then to step S4 for sending the received frames intactly. On the contrary, if the source IP address of the received frame has already been entered in the loop detection table 22 in step S2, then procedure goes to step S5 to check whether or not the received frame ID is equal to the ID obtained from the retrieval of the table. If the two are equal to each other, then procedure goes to step S6, whereas if the two are not equal to each other, then it goes to step S8. In step S6, a check is made to see if for the fragment offset FO the current fragment offset FO (n) and the most recent fragment offset FO (n−1) are equal to each other. If the two fragment offsets FO are equal to each other, then it means the second reception of the fragmented same ID frame, allowing the procedure to go to step S9 in which the received frame is judged to be a loop frame for discard. If the two fragment offsets FO are unequal, then it does not mean the occurrence of the loop frame, allowing the ID and the fragment offset FO to be updated as the frame information of the loop detection table 22 in step S7, with intact sending of the received frame in step S4. When the procedure goes to step S8 as a result of coincidence of the received frame ID (n) with the most recent frame ID (n−1) obtained from the table retrieval, it is judged whether or not the conditional expression (1) or (2) is satisfied. If the conditional expression (1) or (2) is satisfied, then it means the loop frame, i.e., the second reception of the same frame, allowing the received frame to be discarded as the loop frame in step S9. Naturally, if neither the conditional expression (1) nor (2) is satisfied in step S8, then it does not mean the loop frame, so that the frame information of the loop detection table 22 is updated in step S7, with the received frame being sent intactly in step S4. Provided that the received frame is discarded on the basis of the result of judgment of the loop frame in step S9, a check is made in step S10 to see if it is the timer mode for discarding the received frame for a period of time. If no timer mode is set at that time, then the processing comes to an end. If the timer mode is set, then procedure goes to step Si to perform the received frame discard processing in conformity with the timer mode.

Figure 8:
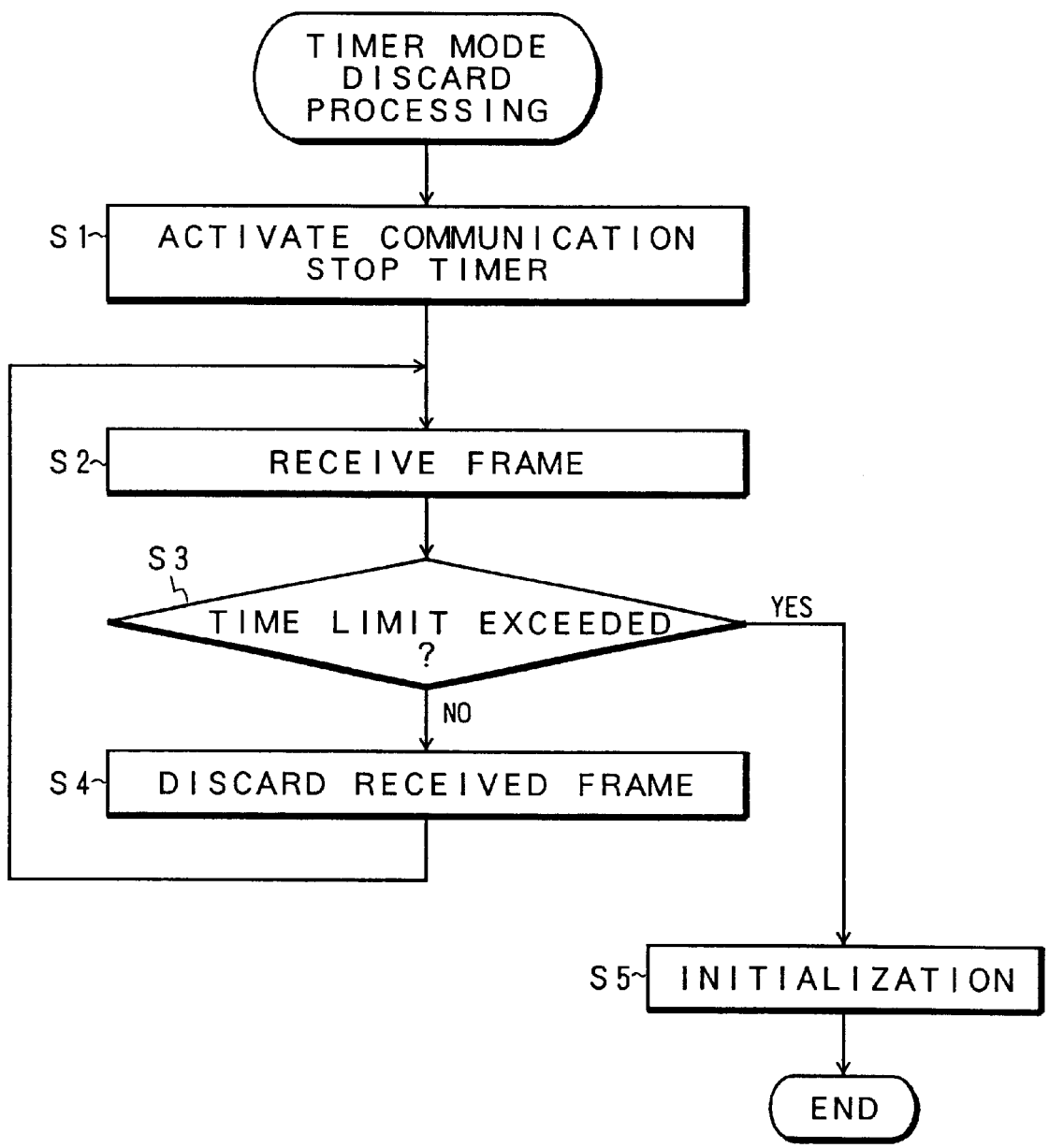
FIG. 8 is a flowchart of frame discard processing effected in the timer mode of FIGS. 7A and 7B.

FIG. 8 is a flowchart showing the details of the timer mode discard processing effected in step S11 of FIGS. 7A and 7B. In the timer mode discard processing, a communication stop timer is activated in step S1, and each time a frame is received in step S2, a check is made in step S3 to see if the communication stop timer has exceeded the time limit. If the time limit is not exceeded, then the received frame is discarded in step S4. If the time limit is exceeded, then procedure goes to step S5 in which initialization is carried out for resetting the communication stop timer, to thereafter terminate the processing. For this reason, in the timer mode discard processing, during a certain period of time determined by the communication stop timer, discard is made of all of the frames received by the port which has received the loop frame. Therefore, the certain period of time of the relay stop set by the communication stop timer can be appropriate time allowing a full removal of anticipated loop frames from the network.

Figure 9:
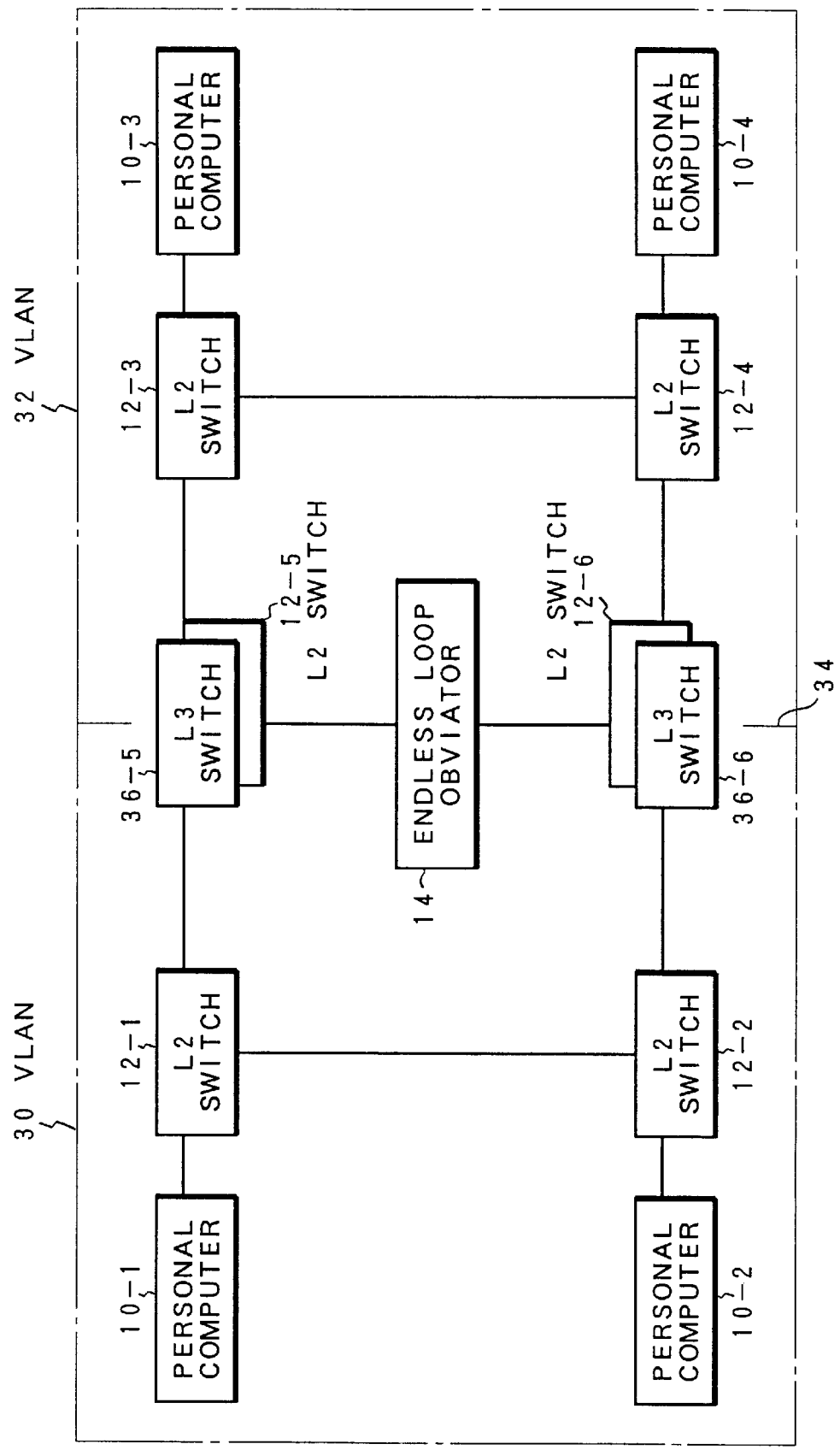
FIG. 9 is an explanatory diagram of a Lan in the case of application of the present invention to a VLAN.

FIG. 9 shows the case of application of the frame relay apparatus of the present invention to the VLAN. Referring to FIG. 9, a network is shown by way of example that comprises two VLANs 30 and 32. The VLAN 30 includes personal computers 10-1 and 10-2 and L2 switches 12-1 and 12-2. The VLAN 32 includes personal computers 10-3 and 10-4 and L2 switches 12-3 and 12-4. On a boundary 34 between the LANs 30 and 32 there is formed a looped transmission path including L3 switches 36-5 and 36-6 which have respective ports connected to each other and which relay frames in accordance with the third layer protocol address, i.e., the layer 3 address. The L3 switches 36-5 and 36-6 disposed on the boundary 34 are provided logically with functions of L2 switches 125 and 12-6 as their respective lower layers, with their respective ports being implemented in the form of port connections of the L2 switches 12-5 and 12-6. The VLANs 30 and 32 serve to limit the broadcast frame transfer to the interior of the group, whereas unicast frames can be transferred without depending on the group. Identification of the broadcast or unicast can be achieved by the foremost part of the source address contained in the frame header information in the L3 switches 36-5 and 36-6. In case of such a provision of the layer 3 switches 36-5 and 36-6 on the boundary 34 between the VLANs 30 and 32, a VID which is a VLAN identifier for identifying a VLAN group is added, for the transfer, to the layer 3 protocol header upon the sending of the frame between the L3 switches 36-5 and 36-6. This allows frames of both the VLANs 30 and 32 to flow between the layer 3 switches 36-5 and 36-6 arranged on the boundary 34. In each of the VLANs 30 and 32, a looped transmission path is formed by the port connection between the L2 switches 12-1 and 12-2 and between the L2 switch 12-3 and 12-4. The two looped transmission paths overlap with each other on the boundary 34, so that between the L3 switches 36-5 and 36-6 there flows a loop frame by an infinite loop generated in each of the VLANs 30 and 32. Thus, in the present invention, the frame relay apparatus 14 of the present invention is arranged on a path extending between the L3 switches 36-5 and 36-6 which are disposed on the boundary 34 between the VLANs 30 and 32. The configuration of the frame relay apparatus 14 in this case is the same as that of the FIG. 3 embodiment except that relay is newly made of the tagged frame of the VLAN by the L3 switches 36-5 and 36-6. Thus, in the loop detection table 22 is entered a VID which is a VLAN identifier indicative of the group of the VLAN 30 or 32 acquired from the header of the tagged frame of the VLAN.

Figure 10:
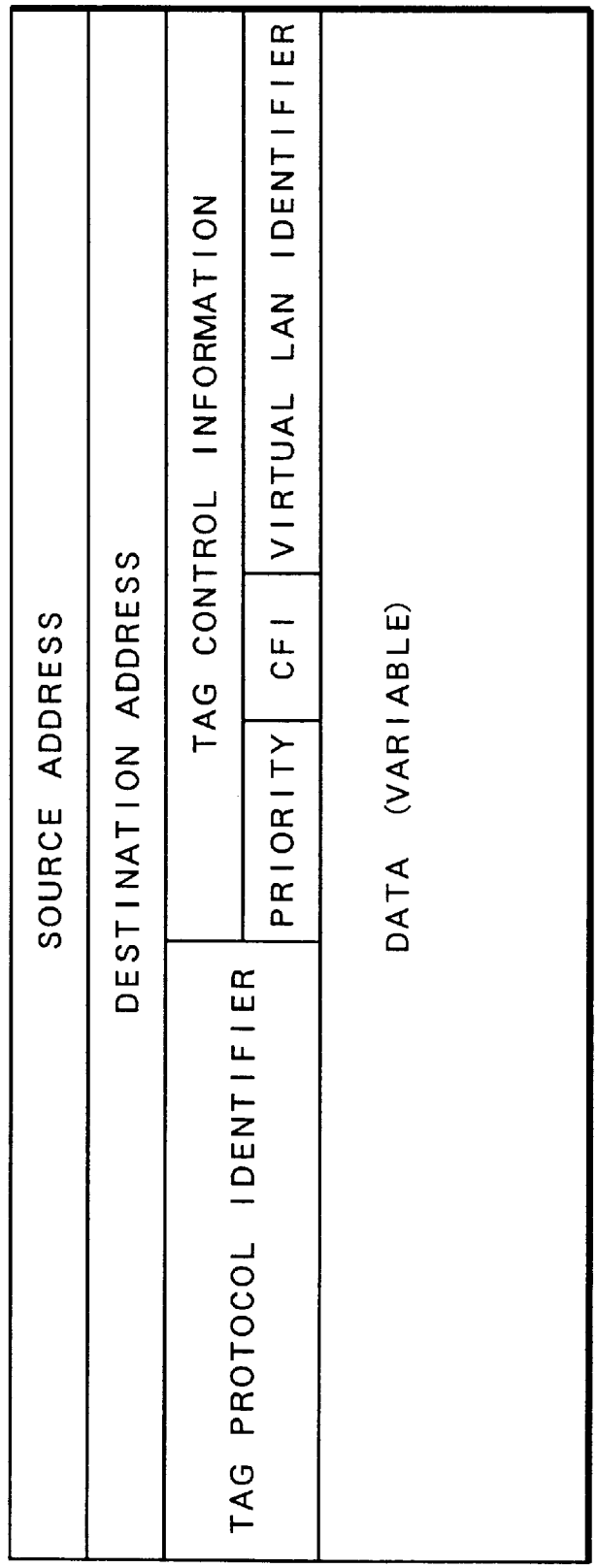
FIG. 10 is an explanatory diagram of a TCP header format resulting in a tagged frame in the VLAN of FIG. 9.

FIG. 10 shows a header format of the second layer protocol for the relay with the layer 3 address of the L3 switches 36-5 and 36-6 provided on the boundary 34 between the VLANs 30 and 32 of FIG. 9. This header format includes a source address SA and a destination address DA which are followed by a tag protocol identifier as the tag type of which field contains as tag control information a priority, a canonical format indicator CFI and a VLAN identifier. For this reason, the VID which is the VLAN identifier is acquired as the header format frame information and is entered together with the source address IP address, ID, fragment offset FO and reception time T which are acquired from the layer 2 switch IP header format, as in the loop detection table 22 of FIG. 11.

Figure 12A:
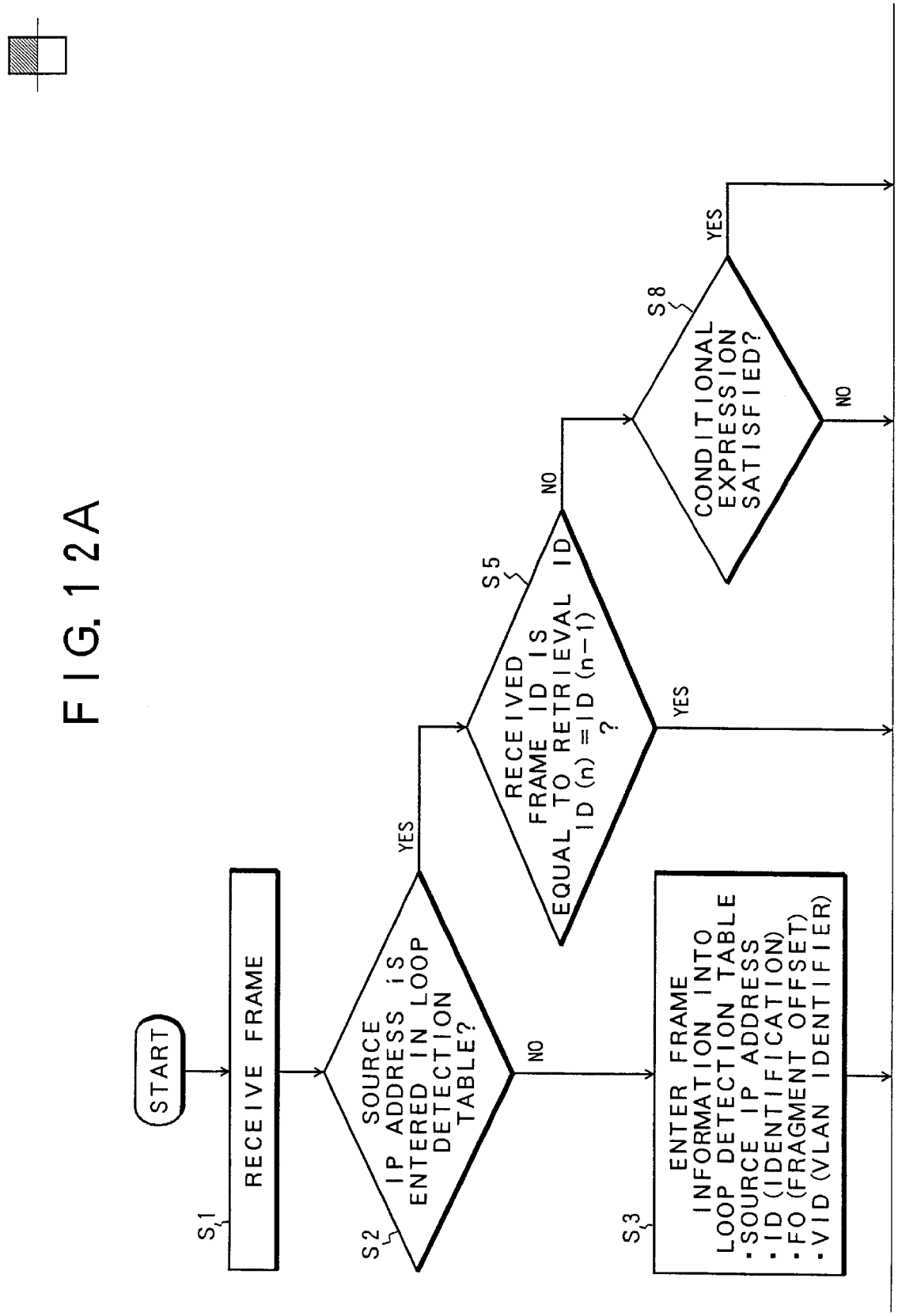
FIGS. 12A and 12B are flowcharts of the frame relay processing of the present invention effected in the embodiment of the VLAN of FIG. 9.
Figure 12B:
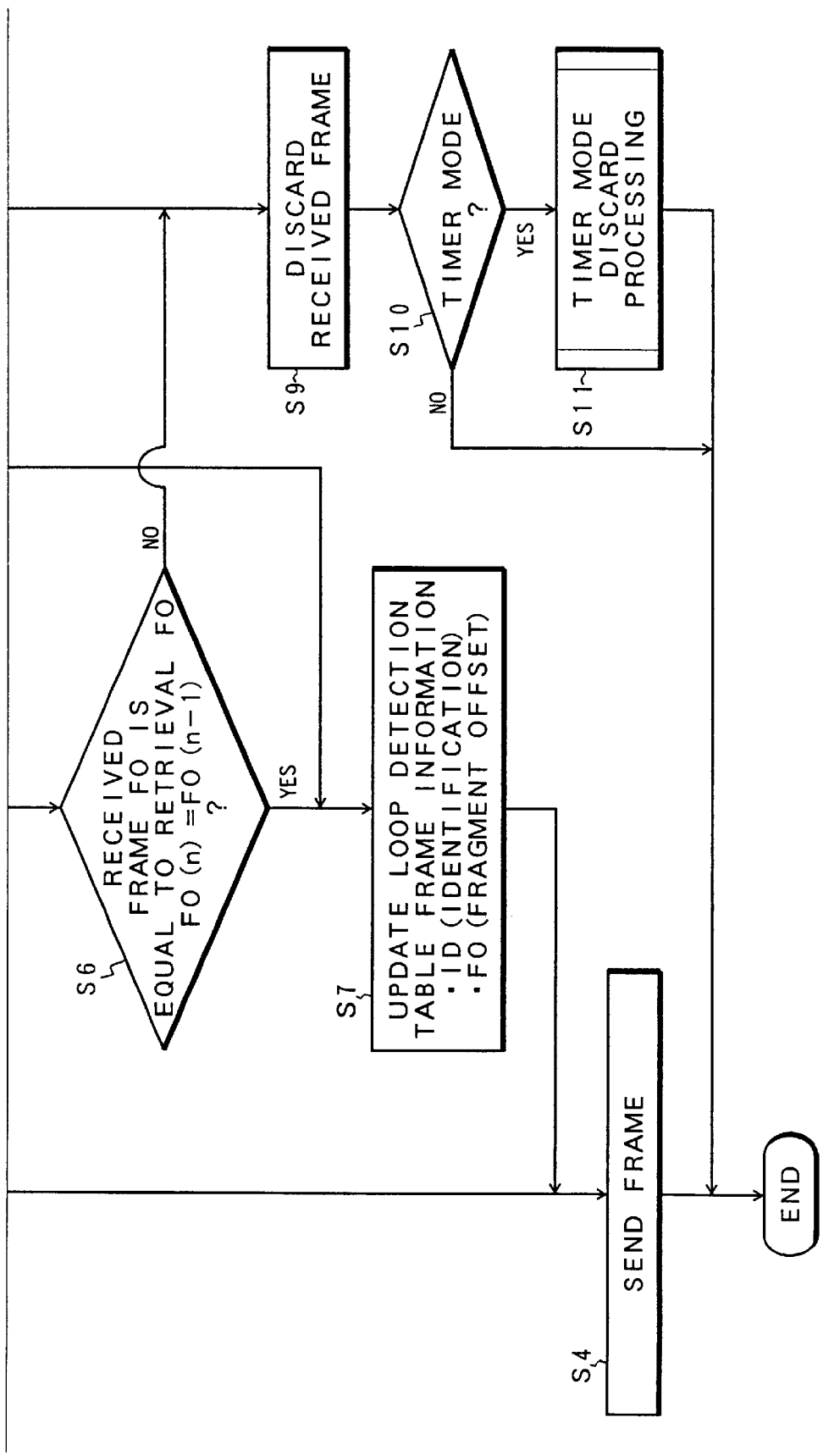

FIGS. 12A and 12B are flowcharts of the relay processing effected by the frame relay apparatus 14 of the present invention disposed on the boundary 34 between the VLANs 30 and 32 of FIG. 9. In these relay processing flowcharts, unless a source IP address is entered in the loop detection table 22 in step S2, then entered as the frame information into the loop detection table 22 in step S3 is a VID which is a VLAN identifier acquired from the L3 switch TCP protocol header, in addition to the source IP address, ID and fragment offset FO obtained from the L2 switch IP protocol header. The other processings are substantially the same as the case of the FIG. 2 LAN shown in FIGS. 7A and 7B, but differs therefrom in the timer mode discard processing for discarding received frames from the same port for a certain period of time after the discard in step S11 as a result of judgment that the received frame is the loop frame.

FIG. 13 is a flowchart of the timer mode discard processing effected in the frame relay apparatus of the present invention disposed on the boundary between the VLANs in step S11 of FIGS. 12A and 12B. In this timer mode discard processing for the VLANs, a communication stop timer is activated in step S1, and if a frame is received in step S2, then a check is made in step S3 to see if the time limit is exceeded. If the timer limit is not exceeded, then a check is made in step S4 to see if the VID of the received frame is the same as the loop detected VID. If that VID is the same as the loop detected VID, then the received frame is discarded in step S5. In case the VID is different from the loop detected VID, procedure goes to step S6 in which the frame is intactly sent without being discarded. If the time limit is exceeded in step S3, initialization processing is carried out for restoring the communication stop timer to its initial state, to terminate the processing. In cases where through such a timer mode discard processing, the frame relay apparatus 14 of the present invention judges that the VID=1 of the VLAN 30 for example is the loop frame at the boundary 34 between the VLANs 30 and 32 of FIG. 9 and discards the same, the frames flowing on the VLAN 30 side of the same VID1 are discarded for a certain period of time whereas the frames flowing on the VLAN 32 side of the VID2 are intactly relayed, whereby it is possible to perform the received frame discard for obviating the infinite loop on the loop occurred VLAN 30 side without affecting the frame relay of the VLAN 32 free from the occurrence of loop.

According to the present invention, as set forth hereinabove, in the frame relay in the looped transmission path, judgment is made from a received frame itself to see if it is a loop frame as a result of double reception of the same frame, to discard the received frame judged as the loop frame or to halt the frame relay from the same port for a certain period of time after the discard, thereby making it possible to prevent the occurrence of an infinite loop of the frames in the LAN to thus improve network reliability in the LAN employing the redundant structure based on the looped transmission path.

The obviation of the occurrence of the infinite loop in the frame relay apparatus of the present invention does not need any interchanges of information with the other apparatuses on the network, but can function completely solely to obviate the occurrence of the infinite loop, so that it can be utilized as techniques for covering the malfunctions of the spanning tree, thereby preventing any occurrence of the infinite loop in the LAN having a looped configuration, to contribute to the building up the LAN having a higher reliability.

Furthermore, the arrangement at the boundary between the two VLANs enables the infinite loop which has occurred in one VLAN to be obviated without affecting the other VLAN, to thereby make it possible to improve the network reliability of the VLAN employing the looped transmission path based redundant structure.

It is to be appreciated that the present invention is not limited to the above embodiments and that it embraces any appropriate variants insofar as they do not impair the objects and advantages thereof. The present invention is not restricted by the numerical values indicated in the above embodiments.

What is claimed is:

1. A frame relay apparatus arranged in a network including a looped transmission path, to obviate the occurrence of an infinite loop of frames, said frame relay apparatus comprising:
   a frame reception unit for receiving a frame;
   a frame sending unit for sending a frame;
   an entry processing unit for entering into a table the frame information and the reception time received by said frame reception unit;
   a loop judgment unit for referring to said table upon the receipt of a frame by said frame reception unit, to detect a second receipt of the same frame to judge the occurrence of a loop; and
   a frame processing unit for allowing a received frame to be sent from said frame sending unit when no loop occurrence is judged, but discarding said received frame without sending the same when a loop occurrence is judged.

2. The frame relay apparatus according to claim 1, wherein said entry processing unit enters the frame information together with the reception time into said table, said frame information including a source address of an IP frame received by a second layer IP protocol, an ID indicative of a packet sending sequence, and a fragment offset indicative of a segmented position when said ID has the same value.

3. The frame relay apparatus according to claim 2, wherein said loop judgment unit, in case said received IP frame source address has already been entered in said table, judges whether a received ID is equal to an entered ID, said loop judgment unit when said received ID is not equal to said entered ID, judging that a loop has occurred if a predetermined conditional expression is satisfied, said loop judgment unit when said received ID is equal to said entered ID, judging that a loop has occurred if a received fragment offset is equal to an entered fragment offset.

4. The frame relay apparatus according to claim 1, wherein said conditional expression for said frame processing unit is used to judge that a loop has occurred if a predetermined maximum packet transfer speed is exceeded by a calculated packet transfer speed PPS of a received frame and an entered frame.

5. The frame relay apparatus according to claim 4, wherein said conditional expression for said frame processing unit is given, when ID (n)>ID (n−1), as $$\{ID(n)-ID(n-1)\}/\{T(n)-T(n-1)\} > \text{MAXPPS}$$

where ID (n) is the value of a received ID, ID (n−1) is the value of an entered ID, IDMAX is the maximum value of the ID, T (n) is the reception time, T (n−1) is the entered reception time, and MAXPPS is the predetermined maximum packet transfer speed, and if the said conditional expression is satisfied, then judgment is made that a loop has occurred, and wherein said conditional expression for said frame processing unit is given, when ID (n)≦ID (n−1), as $$\{IDMAX+ID(n)-ID(n-1)\}/\{T(n)-T(n-1)\} > \text{MAXPPS}$$

and, if said conditional expression is satisfied, then judgment is made that a loop has occurred.

6. The frame relay apparatus according to claim 1, wherein said frame processing unit when judging that a loop has occurred, discards only a received frame of which second receipt has been detected.

7. The frame relay apparatus according to claim 1, wherein said frame processing unit when judging that a loop has occurred, suspends the frame relay for a constant period of time, after the discard of a received frame of which second receipt has been detected.

8. The frame relay apparatus according to claim 1, wherein said entry processing unit enters frame information together with the reception time into said table, said frame information including a source address of an IP frame received by a third layer IP protocol, an ID indicative of a packet sending sequence, and a fragment offset indicative of positions segmented when the ID has the same value, said entry processing unit further entering into said table a virtual LAN tagged frame identifier VID received by said second layer protocol, said loop judgment unit, in case said received IP frame source address has already been entered in said table, judges whether a received ID is smaller than an entered ID, said loop judgment unit when said received ID is smaller than said entered ID, judging that a loop has occurred if a conditional expression based on said reception time and entered time is satisfied, said loop judgment unit when said received ID is equal to said entered ID, judging that a loop has occurred if a received fragment offset is equal to an entered fragment offset.

9. The frame relay apparatus according to claim 8, wherein said frame processing unit when judging that a loop has occurred, discards only a received frame of a virtual LAN of which second receipt has been detected.

10. The frame relay apparatus according to claim 8, wherein said frame processing unit when judging that a loop has occurred, discards a received frame of a virtual LAN of which second receipt has been detected, to thereafter suspend the relay of a frame having the same virtual LAN identifier VID for a constant period of time.

11. A frame relay method for relaying a frame so as to obviate the occurrence of an infinite loop of said frame, said frame relay method being applied to a network including a looped transmission path, said method comprising:

a table entry step for entering into a table the frame information and reception time of a frame received through a port;

a loop judgment step for referring to said table upon a receipt of a frame through said port, to detect a second receipt of the same frame to thereby make a judgment that a loop has occurred; and a frame processing step for sending a received frame to another port unless it is judged that a loop has occurred, but discarding said received frame without sending the same when it is judged that a loop has occurred.

12. The frame relay method according to claim 11, wherein said table entry step comprises entering frame information together with reception time into said table, said frame information including a source address of an IP frame received by a third layer IP protocol, an ID indicative of a packet sending sequence, and a fragment offset indicative positions fragmented when said ID has the same value.

13. The frame relay method according to claim 12, wherein said loop judgment step comprises, in case said received IP frame source address has already been entered in said table, judging whether a received ID is equal to an entered ID, said loop judgment step comprising, when said received ID is not equal to said entered ID, making a judgment that a loop has occurred if a predetermined conditional expression is satisfied, said loop judgment step comprising, when said received ID is equal to said entered ID, making a judgment that a loop has occurred if a received fragment offset is equal to an entered fragment offset.

14. The frame relay method according to claim 13, wherein said conditional expression for said frame processing step is used to make a judgment that a loop has occurred if a predetermined maximum packet transfer speed is exceeded by a packet transfer speed PPS calculated from a received frame and an entered frame.

15. The frame relay method according to claim 14, wherein said conditional expression for said frame processing step is given, when ID (n)>ID (n−1), as $$\{ID(n)-ID(n-1)\}/\{T(n)-T(n-1)\}>\text{MAXPPS}$$

where ID (n) is the value of a received ID, ID (n−1) is the value of an entered ID, IDMAX is the maximum value of the ID, T (n) is the reception time, T (n−1) is the entered reception time, and MAXPPS is the predetermined maximum packet transfer speed, and if the said conditional expression is satisfied, then judgment is made that a loop has occurred, and wherein said conditional expression for said frame processing unit is given, when ID (n)≦ID (n−1), as $$\{ID\text{MAX}+ID(n)-ID(n-1)\}/\{T(n)-T(n-1)\}>\text{MAXPPS}$$

and, if said conditional expression is satisfied, then judgment is made that a loop has occurred.

16. The frame relay method according to claim 11, wherein said frame processing step comprises, when judgment is made that a loop has occurred, discarding only a received frame of which second receipt has been detected.

17. The frame relay method according to claim 11, wherein said frame processing step comprises, when judgment is made that a loop has occurred, suspending the frame relay for a constant period of time, after the discard of a received frame of which second receipt has been detected.

18. The frame relay method according to claim 11, wherein said entry processing step comprises entering frame information together with the reception time into said table, said frame information including a source address of an IP frame received by a third layer IP protocol, an ID indicative of a packet sending sequence, and a fragment offset indicative of positions segmented when the ID has the same value, said entry processing step comprising entering into said table a virtual LAN tagged frame identifier VID received by said second layer protocol, said loop judgment step comprising, in case said received IP frame source address has already been entered in said table judging whether a received ID is equal to an entered ID, said loop judgment step comprising, when said received ID is not equal to said entered ID, making a judgment that a loop has occurred if a predetermined conditional expression is satisfied, said loop judgment step comprising, when said received ID is equal to said entered ID, making a judgment that a loop has occurred if a received fragment offset is equal to an entered fragment offset.

19. The frame relay method according to claim 18, wherein said frame processing step comprises, when judgment is made that a loop has occurred, discarding only a received frame of a virtual LAN of which second receipt has been detected.

20. The frame relay method according to claim 18, wherein said frame processing step comprises, when judgment is made that a loop has occurred, discarding a received frame of a virtual LAN of which second receipt has been detected, to thereafter suspend the relay of a frame having the same virtual LAN identifier VID for a constant period of time.

* * * * *